(12) United States Patent
Hewlett et al.

(10) Patent No.: US 10,859,810 B2
(45) Date of Patent: Dec. 8, 2020

(54) CUSTOMIZED VIEWING SYSTEM FOR AN OPTICAL DEVICE

(71) Applicants: Robert Troy Hewlett, Cumming, GA (US); Jonathan Michael Butler, Gainesville, GA (US)

(72) Inventors: Robert Troy Hewlett, Cumming, GA (US); Jonathan Michael Butler, Gainesville, GA (US)

( * ) Notice: Subject to any disclaimer, the term of this patent is extended or adjusted under 35 U.S.C. 154(b) by 0 days.

(21) Appl. No.: 15/714,505

(22) Filed: Sep. 25, 2017

(65) Prior Publication Data

US 2018/0088310 A1   Mar. 29, 2018

Related U.S. Application Data

(63) Continuation-in-part of application No. 15/274,905, filed on Sep. 23, 2016, now Pat. No. 9,772,497.

(51) Int. Cl.
| | |
|---|---|
| *G02B 27/14* | (2006.01) |
| *G02B 23/12* | (2006.01) |
| *G02B 23/18* | (2006.01) |
| *G02B 27/02* | (2006.01) |
| *G02B 25/00* | (2006.01) |
| *G02B 7/00* | (2006.01) |
| *F21V 21/084* | (2006.01) |
| *G02B 21/20* | (2006.01) |
| *G02B 21/24* | (2006.01) |

(Continued)

(52) U.S. Cl.
CPC .......... *G02B 23/125* (2013.01); *F21V 21/084* (2013.01); *G02B 7/002* (2013.01); *G02B 7/008* (2013.01); *G02B 21/20* (2013.01); *G02B 21/24* (2013.01); *G02B 23/18* (2013.01); *G02B 25/001* (2013.01); *G02B 27/028* (2013.01); *G02B 21/0012* (2013.01); *G02B 21/368* (2013.01); *G02B 27/0176* (2013.01)

(58) Field of Classification Search
CPC ... G02C 1/02; G02C 1/04; G02C 3/02; G02C 5/22; G02C 7/086; G02C 9/02; G02C 5/124; G02C 7/088; G02C 7/16; G02C 9/04; G02C 11/00; G02C 11/02; G02C 11/12; G02C 1/08; G02C 5/001; G02C 5/10; G02C 5/2209; G02C 9/00; G02B 21/24; G02B 25/004; G02B 7/002; G02B 21/241; G02B 25/002; G02B 27/64; G02B 7/24
USPC ................ 359/619–623, 813, 815, 819–822; 351/200, 205–206, 209–211, 221, 222
See application file for complete search history.

(56) References Cited

U.S. PATENT DOCUMENTS

| | | |
|---|---|---|
| 2,647,438 A | 8/1953 | Milen et al. |
| 4,395,731 A | 7/1983 | Schoolman |

(Continued)

FOREIGN PATENT DOCUMENTS

DE   2632663   1/1978

*Primary Examiner* — Brandi N Thomas
(74) *Attorney, Agent, or Firm* — Womble Bond Dickinson (US) LLP

(57) ABSTRACT

Disclosed is an attachment for a standalone optical device to alleviate back and neck strain which allows the eyes of the user relative to the eyepieces of the optical device, with embodiments allowing inclusion of preset values such as shape and dimension of the user's face, eye relief distance, pupillary distance. Movement of the eyes is achieved either by a mechanical pivot or by stretching of the mask being comprised of flexible material.

28 Claims, 16 Drawing Sheets

(51) Int. Cl.
  *G02B 27/01* (2006.01)
  *G02B 21/36* (2006.01)
  *G02B 21/00* (2006.01)

(56) References Cited

U.S. PATENT DOCUMENTS

| | | |
|---|---|---|
| 4,565,428 A | 1/1986 | Arndt et al. |
| 5,341,513 A | 8/1994 | Klein et al. |
| 5,694,650 A | 12/1997 | Hong |
| 6,226,134 B1* | 5/2001 | Davis ............... G02B 21/24 359/610 |
| 6,761,447 B1 | 7/2004 | Pyo |
| 6,827,577 B1* | 12/2004 | Fulbrook ............ G09B 9/307 359/410 |
| 8,922,884 B2* | 12/2014 | Signaigo ........... A61B 19/5223 359/368 |
| 8,955,168 B2 | 2/2015 | Manzella, Jr. et al. |
| 9,772,497 B1* | 9/2017 | Hewlett ............. G02B 25/001 |
| 2007/0053056 A1* | 3/2007 | Charlesworth ......... G02B 7/12 359/367 |
| 2008/0120763 A1 | 5/2008 | Clark |
| 2010/0053544 A1* | 3/2010 | Beasley ............... G02C 7/06 351/54 |
| 2011/0145978 A1 | 6/2011 | Harbin |
| 2012/0087006 A1* | 4/2012 | Signaigo ............. G02B 7/001 359/375 |
| 2015/0070650 A1* | 3/2015 | Seriani ............. A61B 3/0025 351/204 |
| 2015/0143619 A1 | 5/2015 | Cross |
| 2015/0297311 A1 | 10/2015 | Tesar |
| 2015/0377462 A1 | 12/2015 | Wilt et al. |

\* cited by examiner

CUSTOMIZED VIEWING SYSTEM FOR AN OPTICAL DEVICE

STATEMENT REGARDING PRIORITY

This application claims priority to and the full benefit of, and is a continuation in part of, U.S. patent application Ser. No. 15/274,905 filed on Sep. 23, 2016, to be issued on Sep. 26, 2017. The current application incorporates application Ser. No. 15/274,905 in its entirety.

BACKGROUND

Standalone optical devices such as microscopes provide an image or pair of images to a user, and have enough mass or are secured into a position and are able to support the weight of a user's head, neck and back, if a comfortable and workable location for the head to rest were attached to the optical device. Without such a place to lean and rest against, the user often leaned his head, neck and back forward into a position to see through the eyepieces. This leaning often causes short term muscle fatigue and also long term damage to the spine.

For example, the binoculars for a surgical microscope transmit two images, one for each eye, to the user. Binoculars have two eyepieces which normally comprise plastic or metal eyecups which can make contact with the user's eye socket. Although these types of binoculars with eyepieces have been in existence for very long, there are numerous practical difficulties experienced by the users.

The eyepieces of the optical systems are normally configured and attached to the optical system in a manner which does not allow the user's head to rest on them. The user is often required to view into the eyepieces of binoculars (or a single eyepiece for a monocular device) for extended periods such as during a surgical procedure. With prior art eyepieces, the microscope user can experience neck and back strain from using neck and back muscles and the spine to stabilize the head during long periods of time using the optical system. With prior art binoculars or monoculars with eyepieces, users are unable to lean against the plastic or metal eyepiece cups in an optimum manner. For example, prior art eyepiece cups provide at most, two small points for the user's brow, but the pressure brought by the user at these small areas creates discomfort if the pressure continues long enough. That is, prior art eyepiece cups have not been constructed to support a user's head and back comfortably for long periods of use, such as in surgical procedures. Many optical device users are unable to continue their careers when problems caused by neck and back strain accumulate from years of optical system use, and these kinds of problems can be experienced by any user of optical devices.

The visual images produced for the user by the current eyepieces are not always ideal. That is, the optical environment for the user, comprising pupillary distance (PD), refractive lens correction, and the length of the focal image plane (eye relief), is highly variable from individual to individual. For instance, a user's PD varies depending on the size of the user's face. Also, optical device users often have vision which is corrected by refractive lenses, and adjustable diopters are provided in prior art binoculars with eyepieces, but these can be difficult or impractical to adjust during or even between surgeries. Finally, the distance between the user's cornea and the eyepiece lens (eye relief) affects the user's experience also. The user must hold his head steady in space at several locations in order to find the best image, and this in turn will create neck or back strain as the user attempts to hold her head steady in space in a fixed position. The foregoing conditions mean that achieving the best optical environment takes a great deal of adjustment and generally leads to neck and back strain.

The column of light exiting the optical device toward the user is called the View Field. When a user rotates his eye(s) while viewing through an optical device, thus moving his eyes relative to the eyepieces of the optical device, the View Field is frequently only partially seen because the center of the user's cornea is no longer centered with the eyepiece lens. With the prior art optical devices, which do not allow movement in relation to the eyepiece(s) of the optical device, eye rotation, which is needed to see the periphery of the view field in the optical device, and actually does not allow the user to visualize the periphery at all.

Thus, there are many practical deficiencies with current optical device binoculars and monoculars with eyepieces which create challenges for delivering the best visual image, and maintaining the health of the user's neck and back.

The present invention provides a number of solutions to these problems, as discussed below.

Figure 1:
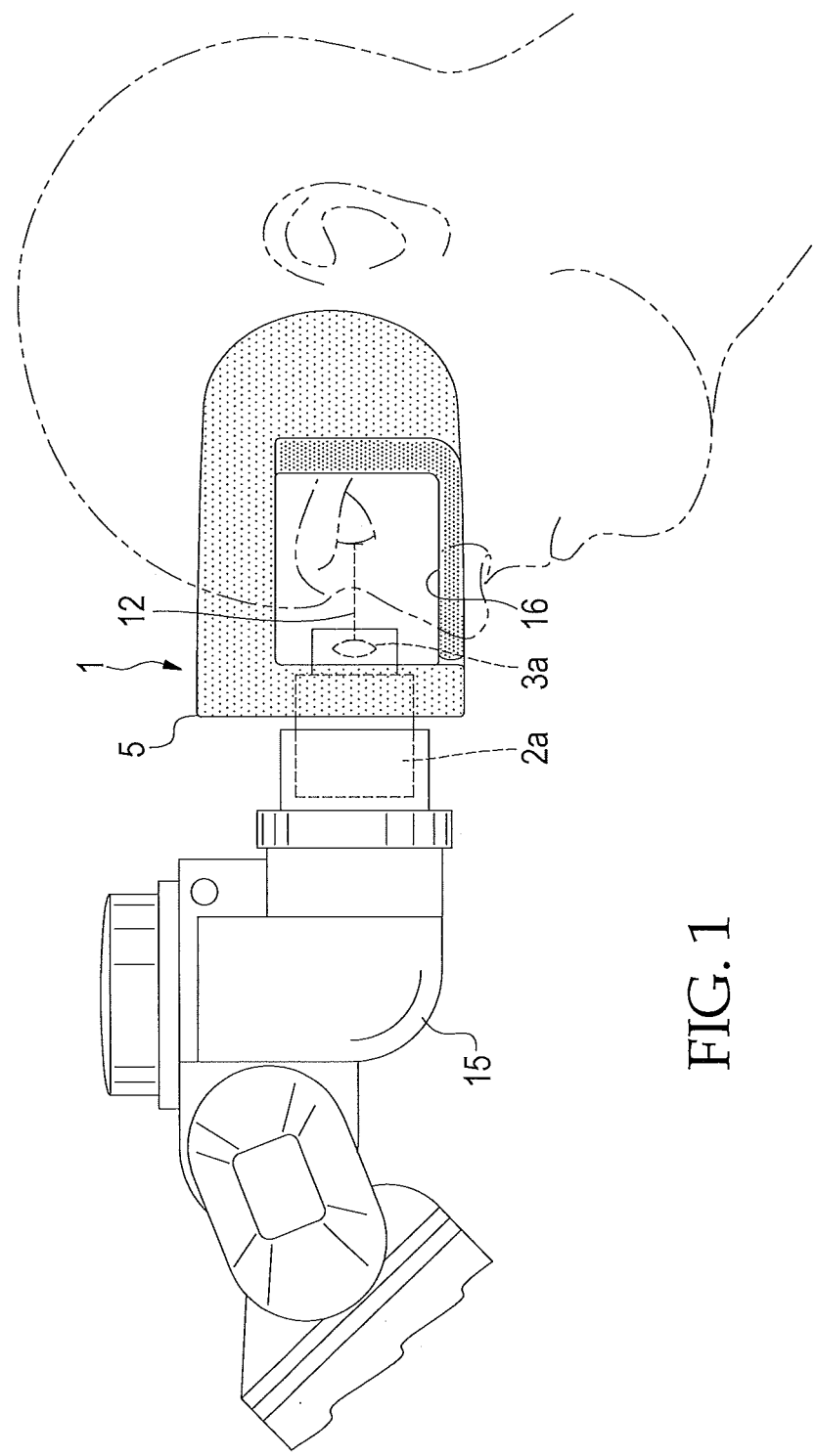
FIG. 1 is a schematic side view of a user's face contacting the inner contour of the mask and the eyepieces secured to the binocular housing of an optical device. A window covering a cutout is depicted, through which may be seen the eyes positioned toward the lens(es) of the eyepiece(s) at an optimal eye relief distance.

Regarding all the figures with eyepieces, these can either be part of an embodiment of the invention or, alternatively, the eyepieces are part of the optical device and are shown as being connected to the eyepiece openings.

DETAILED DESCRIPTION

The invention, in one embodiment, is a customized attachment 1 to a standalone optical device, such as a microscope, telescope, sighting system for a weapon, a video game, or a virtual reality device, which is not worn as a head-mounted device. That is the standalone device can support the head, neck and back of a user who leans against it, and the invention provides the location against which the user may lean in order to prevent neck and back strain. The invention also may incorporate preset values obtained from measurements of the user's face which are built into the structure of the system, in order to minimize practical difficulties in using adjustable settings, and to solve other problems described herein.

In one embodiment, the viewing system for attachment to a separate, standalone optical device 15 comprises at least one eyepiece 2a, 2b secured by a pivot 20, i.e., any of a number of mechanical means, which is secured to a mask 5 which comprises at least one eyepiece opening 6a, 6b. In certain embodiments, an eyepiece is secured within the eyepiece opening and, in other embodiments, an eyepiece is not part of the invention but the eyepiece opening of the invention is secured to the eyepiece of the standalone optical device. The inner contour of the mask may be customized to the size and shape of a user's face. An eyepiece comprises at least one rigid sidewall in any practical shape (e.g., round, square, oval and the like) and at least one optical element such as a lens for transmitting light beams from the optical device to the user's eye. Each said eyepiece also comprises a first end 13a, 13b and a second end 14a, 14b and each said eyepiece comprises a lens 3a, 3b located near the second end 14a, 14b and each said lens 3a, 3b comprising a center 4a, 4b, and said center of each said lens may be spaced in relation to the center of the other said lens at a distance similar to a measured pupillary distance (PD) 11 of the user. In one embodiment, each said lens may also be positioned at an optimal eye relief distance 12, such that the user can rest his or her face against the mask and thereby prevent neck and back strain.

In one embodiment, the lenses 3a, 3b, one for each eye, are selected to correspond to the user's prescription lenses or, if no prescription is needed, the eyepieces are set to plano. Each lens 3a, 3b has a center 4a, 4b upon which the user may center the pupils of the eyes. Each lens is seated or secured near the second end 14a, 14b of each eyepiece, which can also be described as the ends of the eyepieces closest to the user. Pupillary distance 11 is the distance between the centers of the user's pupils. The retina has a preferential area for resolving images with small details and, for the best vision, light should be focused on those areas. In order to deliver the optimal image to the user's retina, the image delivered to the eye should be in focus at the user's cornea so that the image may be delivered optimally through each pupil and lens of the eye to the retina. The lenses 3a, 3b are also placed at a customized distance from the user's cornea so that the light passing through forms an optimum image on the user's retina, and the image is clearest, as shown in FIG. 1. That is, the invention is customized to place the user's cornea on the same plane as the eye relief 12 produced by each eyepiece. The customized eye relief distance is achieved by shaping the mask to the dimensions and shape of the user's face, as measured from the user himself, particularly the inset of the eyes and their position relative to the rest of the user's face.

In one embodiment, the centers 4a, 4b of the lenses 3a, 3b in the invention are located relative to one another, that is, they are spaced at a distance which is a particular user's PD as measured from the user, as PD 11 is shown in FIGS. 1 and 2. The lenses 3a, 3b are also customized to carry the refractive prescription for the user's eyes. The invention further comprises a mask 5 which secures the two eyepieces 2a, 2b in eyepiece openings 6a, 6b one for each eyepiece.

Figure 16:
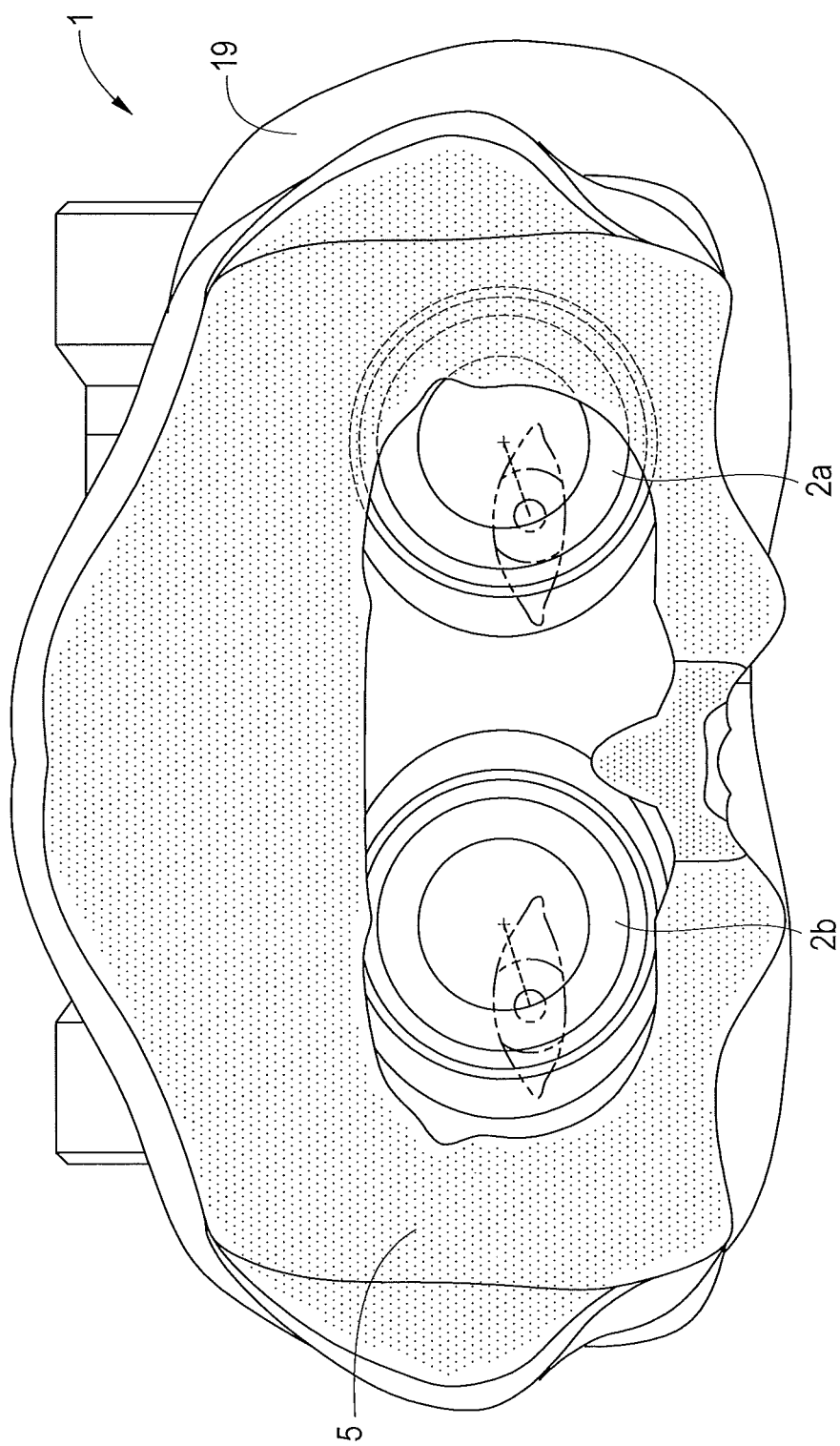
FIG. 16 is a rear elevation of the embodiment of the invention with the mask comprising flexible material having been stretched so that the eyes (shown in dotted lines) can look to the right, as shown by the lines from each eye pupil to the center of each lens.

The mask 5, in one embodiment is positioned so that the user can rest his or her head completely on the mask, thus eliminating neck and back strain. The mask is not worn by the user but is attached to the optical device. In one embodiment the mask 5 may not be customized to the shape and dimensions of the user's face, as long as it provides a place for the head to rest during usage. The mask can be made of any material which is strong enough to secure the eyepieces substantially in the same plane, and that material may be relatively inflexible or it may be flexible to allow stretching, as shown in FIG. 16. In one embodiment, the mask may be composed of a polymer which is formed by a 3D printer communicating with a camera enabled to produce 3D images of the face. In another embodiment, the mask can be produced by the older method of taking a plaster mold of the face and then producing a plastic structure therefrom. In one embodiment, a chin rest may also be provided. In another embodiment, padding 17 of relatively soft material such as closed cell foam or rubber is attached to the border 18 of the mask 5 which would contact the user's face. The mask may cover only the upper portion of the face (forehead to nose) or may extend further down towards the chin, as long as allowance may be made to prevent condensation on the eyepieces from the user's exhalation.

The drying of the user's eyes from the air flow typical in a surgical environment is a problem which often requires a user to administer wetting drops to the eyes frequently. Another factor producing dry eyes is that, at certain points, the user might blink the eyes much less frequently to avoid missing any action or developments, and so this retards the eyes' ability to moisten themselves by blinking. In one embodiment, the mask 5 has a cutout 10 on each side so that the user can use peripheral vision. To solve the dry eye problems which might occur in the embodiment with cutouts 10, the cutouts may be enclosed with a window 16 comprising clear plastic or glass which allows the user peripheral vision and also maintains a closed chamber which is the space between the mask and the user's face. The user's face is pressed against the mask, thereby shielding the eyes from the air flow typical in a surgical environment, and to retain a moister environment for the eyes.

The warm moisture retained between the invention and the user's face, though, can create a problem of condensation on the eyepieces if the environment of use, for example in surgery, is cool. In one embodiment the mask comprises at least one battery or other power source (not shown), optionally housed in a cavity 8 in the mask, for powering circuitry to operate at least one heating or peltier element 9 for heating or cooling the mask and/or the eyepieces. Optionally, a circular cavity 27 for a coil for charging a battery also may be included. Many environments are cool where the invention is used, such as operating rooms, and heating the eyepieces prevents condensation from forming on the eyepiece lenses.

The eyepieces 2a, 2b may be connected to an optical device such as a microscope through any mechanical means such as threading, clips, screws or also through magnetic force.

In one embodiment, the invention comprises a mask 5 comprising two eyepiece openings 6a, 6b. The mask may be customized to the size and shape of a user's face, and each said eyepiece opening 6a, 6b is configured for attachment to an eyepiece of the invention, or the eyepiece incorporated into the standalone optical device. Each said eyepiece and eyepiece opening has a center 4a, 4b, which is defined by the centers of the user's eyes, and an eyepiece is spaced in relation to the center of the other said eyepiece opening 6a, 6b at a distance similar to a measured pupillary distance of the user. Each said eyepiece opening is also configured so that a lens 3a, 3b of an eyepiece of an optical device is at an optimal eye relief distance 12 for the user, that is, the image from the optical device is optimally focused at the user's cornea. As a result of the foregoing, the user can rest his or her face against the mask and thereby prevent neck and back strain. In one embodiment, the eyepieces are not provided and the invention attaches to eyepieces which are part of an optical device. In this embodiment, the center of an eyepiece opening is the point at which a center of a lens on an eyepiece of the optical device is located when the invention is attached to an optical device.

Figure 2A:
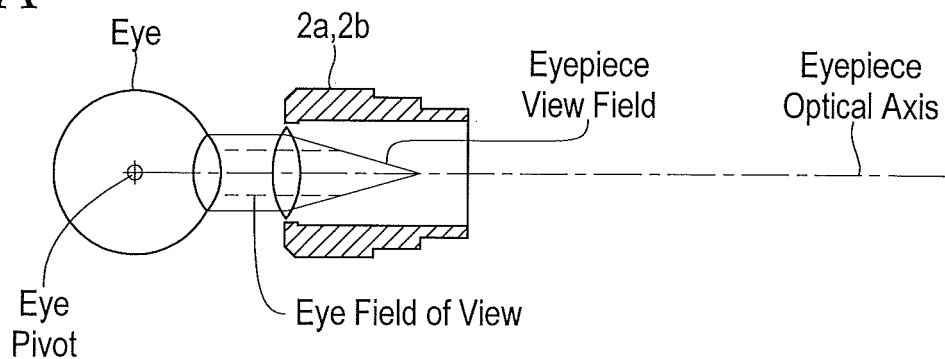
FIGS. 2a, 2B and 2C are schematics showing that, for many optical devices, the user's field of view and eyepiece view field are not always optimal.
Figure 2B:
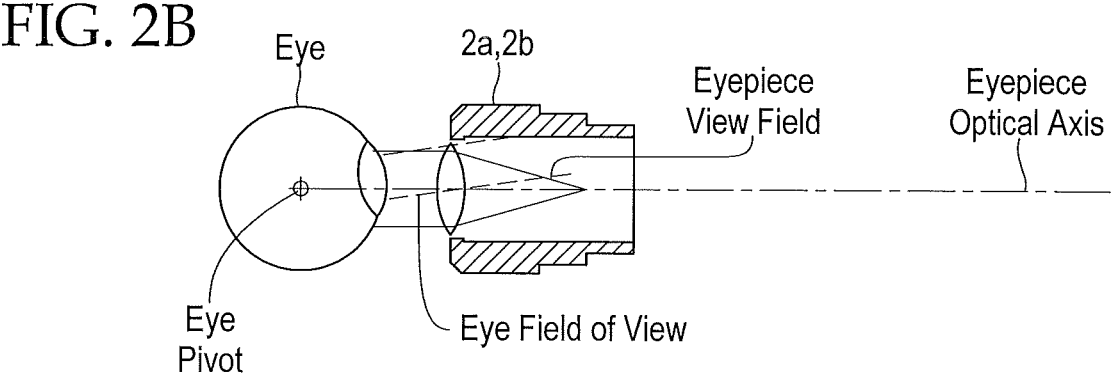
Figure 2C:
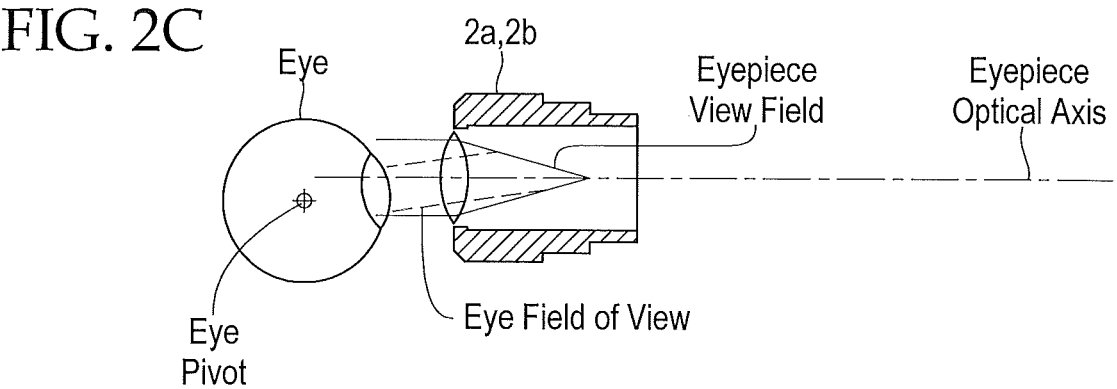
Figure 3:
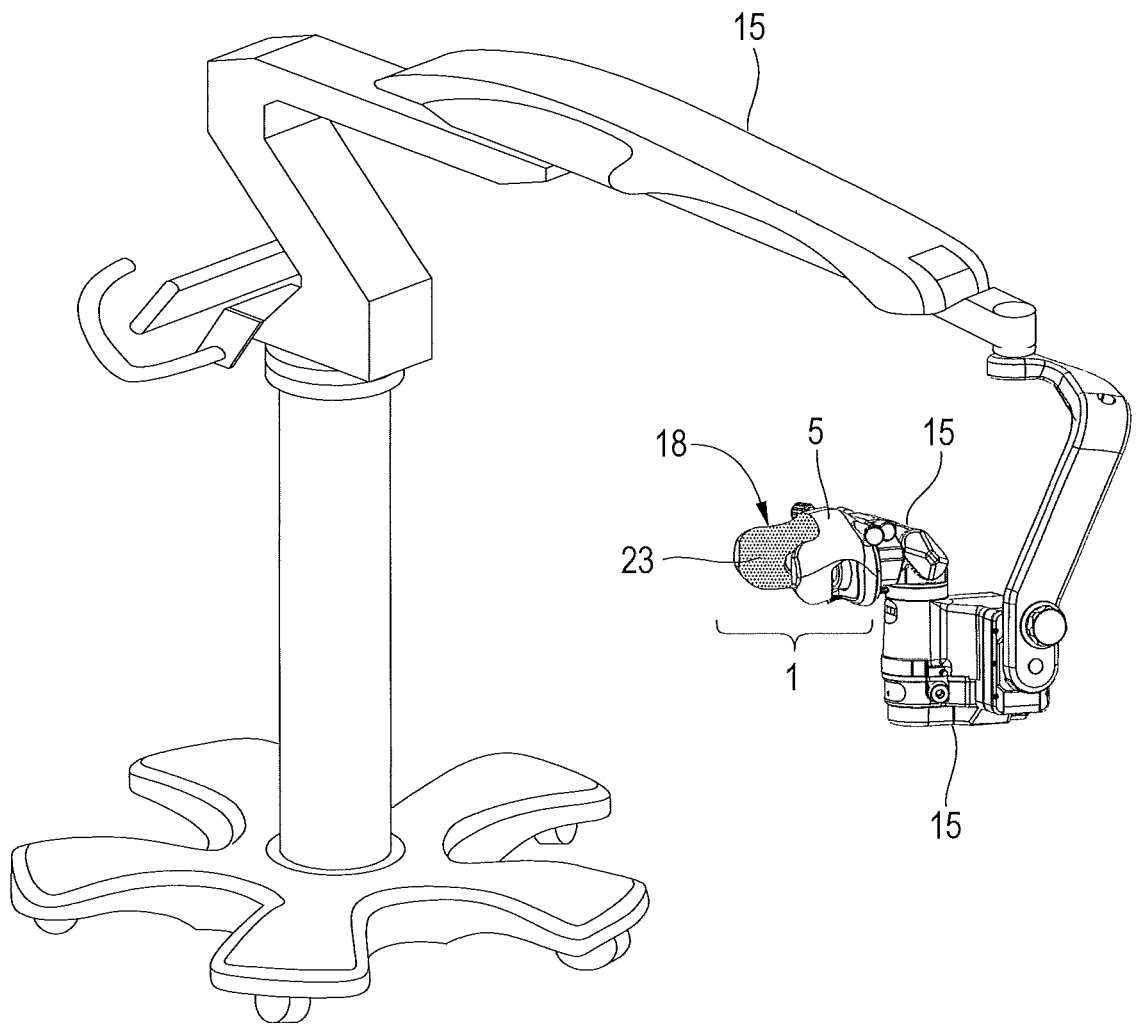
FIG. 3 is a perspective view of the embodiment of the attached to a standalone optical device (in this example, a surgical microscope).

In another embodiment, the optical device may be one or more screens projecting an image as in a video game or a virtual reality device. In another embodiment the optical device can be the optical components of a weapon or weapon system. In another embodiment, the optical device is a telescope. In another embodiment, the optical device can be monocular such as in certain laboratory microscopes. In such a monocular embodiment, only one eyepiece can be inserted into an eyepiece opening 6a, 6b. All embodiments of the inventions require that the optical devices are standalone and able to support a user's head, neck and back when she leans against it The solution for making more of the optical device's exit pupil available to the user is shown in FIGS. 2A, 2B and 2C. FIG. 2A shows the eye centered and looking straight into the eyepiece. The user's field of view is coaxial with the eyepiece view field and concentric producing a full circle image. FIG. 2B shows the eye rotated to look to the periphery without the eye moving laterally. The user's field of view and the eyepiece view field do not coincide leaving a clipped or partial view. FIG. 2C shows the eye rotated and moved laterally after the mask 5 has moved, and in this position the eye's field of view is completely contained within the eyepiece view field, yielding a complete and round image. The small movements of the head could fall within a range of 0.1 to 5 millimeters in either direction side to side, depending on the optical device. The structure and skin of the face makes up and down movement feasible without any feature of the present invention. That is, the skin of the face has enough give or play to allow the head to move readily within the range of 0.1 to 5 millimeters in either direction side to side. Side to side movement, however, is not readily available to the user because the skin does not move as readily, in that direction, and also the nose is obstructed by the need of the mask to rest on the user's nose. Disclosed herein, are several means for allowing side movements for the user's head, while the eyepieces (either of the invention when provided as part of the invention or of the optical device when provided by the optical device), remain in a fixed location. The pivot 20, or multiple pivots, may be configured for movement laterally or vertically.

To allow movement of the mask, and therefore the user's head and eyes, there are several means to do so, as set forth herein.

Figure 4A:
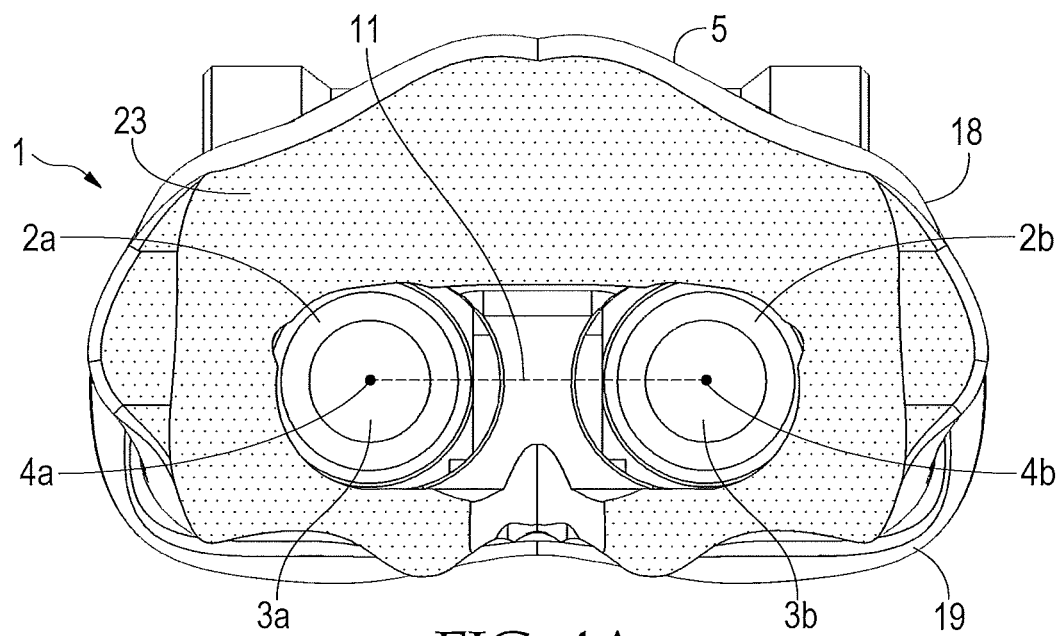
FIG. 4A is a rear elevational view and FIG. 4B is a rear perspective view of an embodiment of the invention and the binocular housing of the optical device. Pupillary distance between the centers of the lenses is depicted.
Figure 4B:
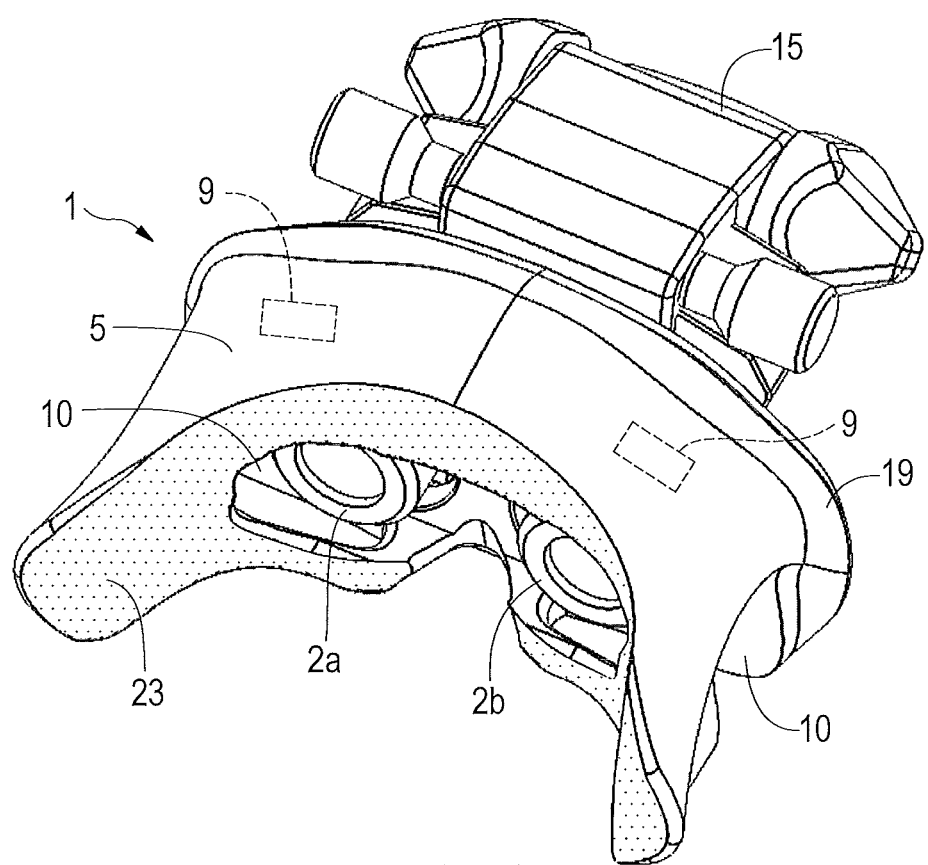
Figure 5A:
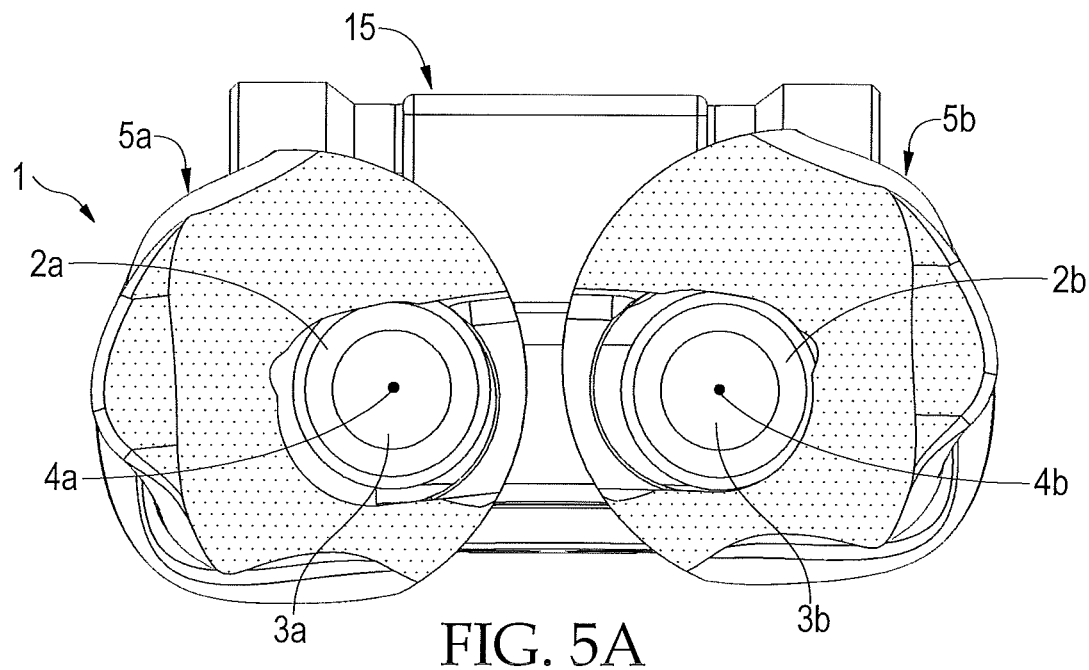
FIG. 5a is a rear elevational view and FIG. 5b is a rear perspective view of an embodiment of the invention with the mask in a right and a left half (including a right and a left cover) and the binocular housing of the optical device.
Figure 5B:
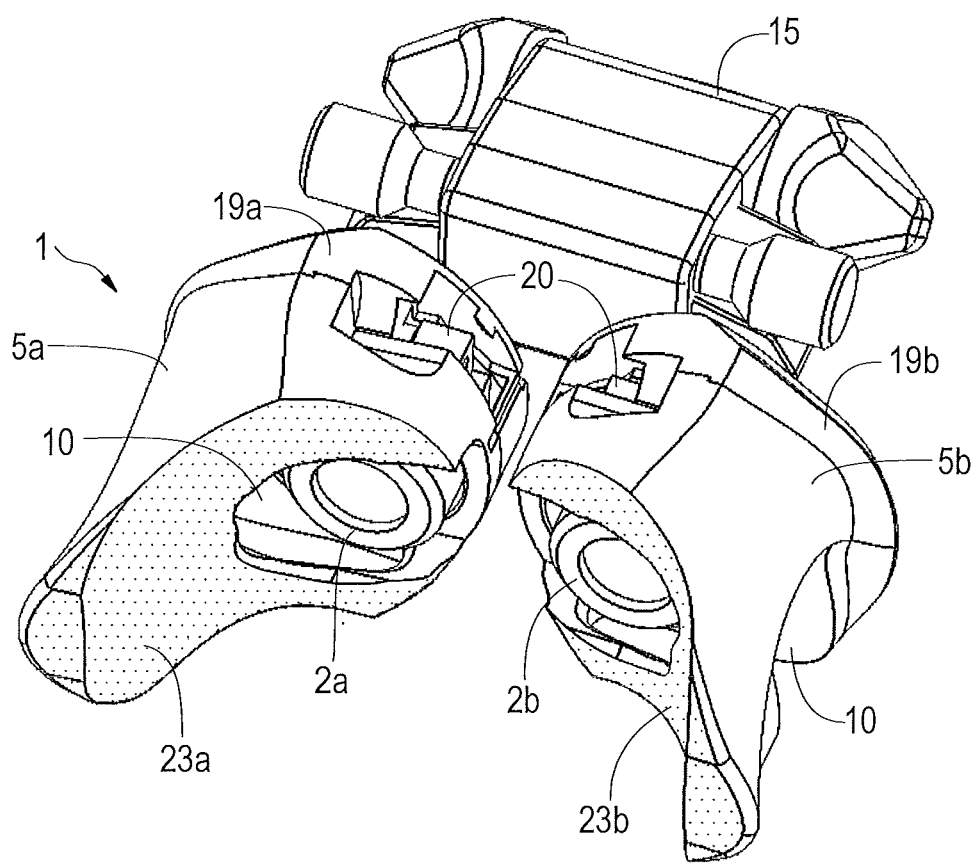

In one embodiment, the invention comprises an attachment to a standalone optical device 15, said attachment comprising a mask 5 comprising at least one eyepiece opening 6a, 6b configured for connection to an eyepiece 2a, 2b of the standalone optical device, said mask connected to at least one pivot 20 at a first location, said pivot also configured at a second location for connection to an eyepiece of the optical device such that, upon securing the attachment to the optical device, the user can rest his or her face against the mask and thereby prevent neck and back strain, and move the user's eyes by moving the mask in relation to the eyepiece by moving the pivot. The mask may cover the entire upper portion of the user's face, having a center corresponding to a vertical axis at the middle of a user's nose, for example in FIGS. 4A-4B. In another embodiment, as for example in FIGS. 5A and 5B, the mask 5 further comprises two of said eyepiece openings and two of said pivots 20, and the mask further comprises a half for a right side of the face 5b separated from a half for a left side 5a of the user's face, and each of said right and left halves 5b, 5a comprises one of the pivots so that each half moves independently of the other half by means of its own pivot. The pivots depicted in FIGS. 6-14 may thus be employed to move the entire mask 5 or each separate half of the mask 5a, 5b and, in such a case, the cover 19 may be separated into two halves 19a, 19b.

In another embodiment, the invention comprises an attachment to a standalone optical device, said attachment comprising a mask comprising flexible material, which is elastic and allows stretching (as in FIG. 16), and at least one eyepiece opening configured for attachment to an eyepiece of the optical device such that, upon securing the attachment to the optical device, the user can rest his or her face against the mask and thereby prevent neck and back strain, and stretch the mask so that the user's eyes may move in relation to the eyepiece. The flexible material in the mask is selected from a group consisting of rubber, silicone, plastic and plastic foam, and allows the user's head to move without the necessity of a pivot, such as by stretching in response to pressure exerted by the user's head when she is seeking to view part of the visual field of the optical device. In this embodiment, the mask itself remains anchored in the same location, but the elasticity of the material in the mask stretches and allows the user's eyes to move in relation to the eyepieces.

In another embodiment, the invention comprises an attachment to a standalone optical device, said attachment comprising at least one eyepiece, a mask and at least one pivot, said at least one eyepiece at one location configured for connection to the optical device and comprising a lens, said mask connected to the at least one pivot at a first location and said pivot at a second location connected to the at least one eyepiece such that, upon securing the attachment to the optical device, the user can rest his or her face against the mask and thereby prevent neck and back strain, and move the user's eyes by moving the mask in relation to the at least one eyepiece by moving the pivot. In another embodiment, the invention further comprises two of said eyepieces and two of said pivots, and the mask further comprises a half for a right side of the face separated from a half for a left side of the face, and each of said right and left halves comprises one of the pivots connected to one of the eyepieces. In another embodiment, the mask further comprises a customized inner contour for the user's face, and the customized inner contour positions the eye of a user at an optimal eye relief. The attachment may also comprise at least one lens, and each lens may comprise a refractive prescription for one of the user's eyes. Each of the lenses has a center, and the centers may be spaced at a measured pupillary distance of the user.

In another embodiment, the invention comprises an attachment to a standalone optical device comprising at least one eyepiece, a mask comprising flexible material, said at least one eyepiece at a first position connected to the optical device and comprising a lens, said eyepiece at a second position connected to said mask such that, upon securing the attachment to the optical device, the user can rest his or her face against the mask and thereby prevent neck and back strain, and stretch the mask and move the eyes in relation to the at least one eyepiece, as shown in FIG. 16. The flexible material is selected from a group consisting of rubber, silicone, plastic and plastic foam, and there are many more flexible materials which fit into this group. In this embodiment, the mask itself remains anchored in the same location, but the elasticity of the material in the mask stretches and allows the user's eyes to move in relation to the eyepieces.

In another embodiment, the attachment comprises two of said eyepieces, and the mask further comprises a half for a right side of the face separated from a half for a left side of the face. The mask may further comprise an inner contour customized for the user's face, and the customized inner contour may position the eye of a user at an optimal eye relief. In another embodiment the at least one lens further comprises a refractive prescription for one of the user's eyes, and each of the lenses has a center, and the centers may be spaced at a measured pupillary distance of the user.

The pivot herein is connected at a first position securely to the mask or to the cover securely, so that the user's application of pressure to the mask moves the mask in that direction, as depicted in FIGS. 6, 7A-7B, 12 and 14, thus allowing the user's eyes to move in relation to the eyepieces. The pivot is also connected, at a second position, to the eyepiece(s) which do not move in response to pressure from the user. That is, the eyepieces remain stationary under normal usage once they are locked into a position using the optical device's clutches and brakes, or other mechanical methods for fixing the binocular or monocular housing. At the second position the pivot may be "connected to" the eyepiece(s) (1) directly, or (2) indirectly to another portion of the optical device fixed securely to the eyepieces such as the binocular or monocular housing 15, as depicted in FIG. 15. When the connection between the eyepiece(s) and the pivot is indirect, such as at the binocular housing, a desirable configuration for the pivot may be as shown in FIGS. 8-11 and 13.

In another embodiment, the invention may comprise a pivot, and the mask may also be comprised of flexible material to facilitate movement of the eyes of the user by a combination of a pivot and the mask comprising flexible material.

In another embodiment the mask 5, 5*a-b* further comprises a customized inner contour based upon a shape of the user's face, and the customized inner contour may position the eye of the user at an optimal eye relief distance 12 from a lens 3*a*, 3*b* of the at least one eyepiece of the optical device 15, which distance is measured by a mold or 3D imaging and subsequent additive manufacturing. The environment for use of the optical device sometimes being challenging, embodiments of the mask may further comprise at least one heater for warming the mask or the eyepiece(s), at least one peltier element for cooling the mask or the eyepiece(s), and/or a fan (not depicted) for ventilation of a chamber formed when the user's face is pressed against the mask. In another embodiment the mask further comprises a cutout 10 on each side which enables the user to see with peripheral vision, and the cutout may be enclosed with a window 16.

Definitions

"Mask" includes the cover 19 when the cover is attached securely to the mask.

"Pivot" includes any mechanical device or assembly enabling linear (vertical or lateral) or rotational movement. The "pivot" may be selected from a group consisting of, a rail assembly, a tongue and groove assembly, a dovetail assembly, a gimbal assembly, a rocker arm assembly, a spring loaded assembly, a low friction plate assembly, a bearing assembly, and a flexible material pad.

"Connected" or "connection" means a direct connection, or an indirect connection which is secure and not subject to bending or flexing during normal use. For example only, an indirect connection the eyepiece(s) includes, without limitation, the structure between the eyepiece(s) and a binocular/monocular housing or other component of a standalone optical device. That is, the housing is substantially fixed in location relative to the eyepiece(s) of the optical device, even though they are not touching directly.

Additional Discussion Re Pivots

Figure 6A:
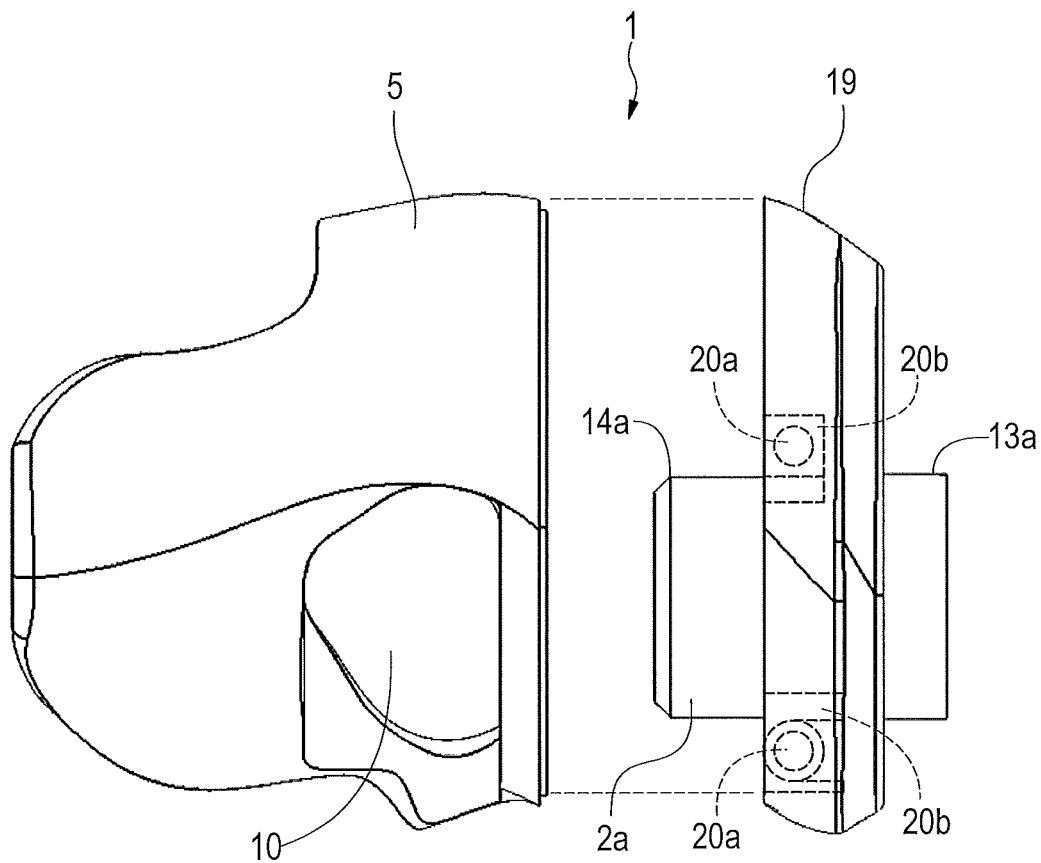
FIG. 6A is a side elevational view of one embodiment of the mask herein and a cover wherein the pivot, here a rail assembly shown in dotted lines, is mounted to the cover and also to the eyepieces.
Figure 6B:
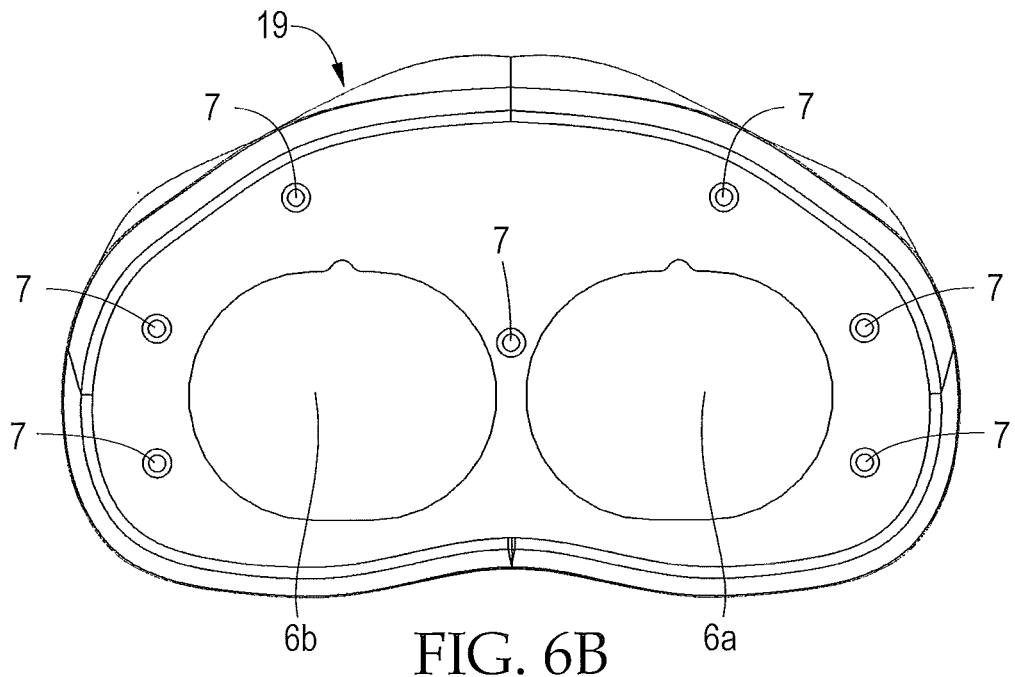
FIG. 6B is a front elevational view of the cover of the mask, without eyepieces in the eyepiece openings.
Figure 7A:
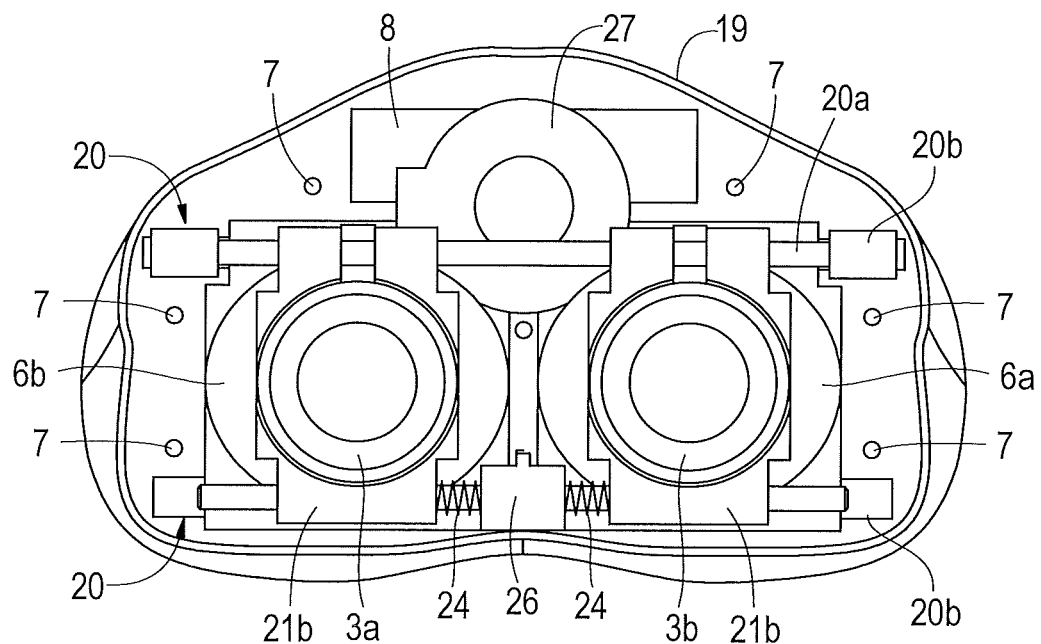
FIG. 7A is an elevational internal view of the embodiment in 6A-B in which the pivot, here a rail assembly, is mounted to the cover and to the eyepieces.
Figure 7B:
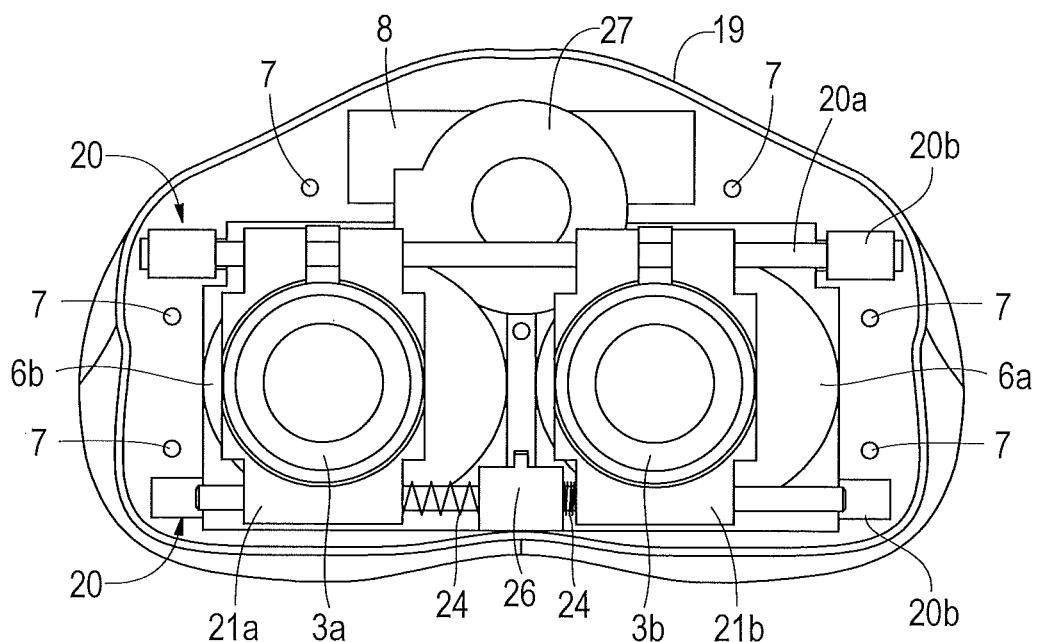
FIG. 7B is the same as 7A, but showing the movement of the mask.

FIGS. 6, 7A and 7B depict an embodiment of the pivot 20 as a rail assembly. FIG. 7A shows two rails 20*a* in parallel and each secured at each end by an anchor 20*b*, and two eyepiece housings 21*a*, 21*b*, each of which is connected directly to an eyepiece 2*a*, 2*b* and also engaged slidably with each rail 20*a* which passes through a tunnel in each of the eyepieces housings. Each eyepiece housing can move in either direction along the rails, for example when the user's head applies pressure to the mask, and movement of the eyepiece housings here (and movement of the eyepieces themselves) is limited by a stop 26. In one embodiment the movement of the eyepiece housings is reversed automatically when pressure from the user's head is removed, by springs 7 placed on each rail between each eyepiece housing and the stop. Movement of the eyepieces and eyepiece housings is demonstrated in FIG. 7B.

Figure 8:
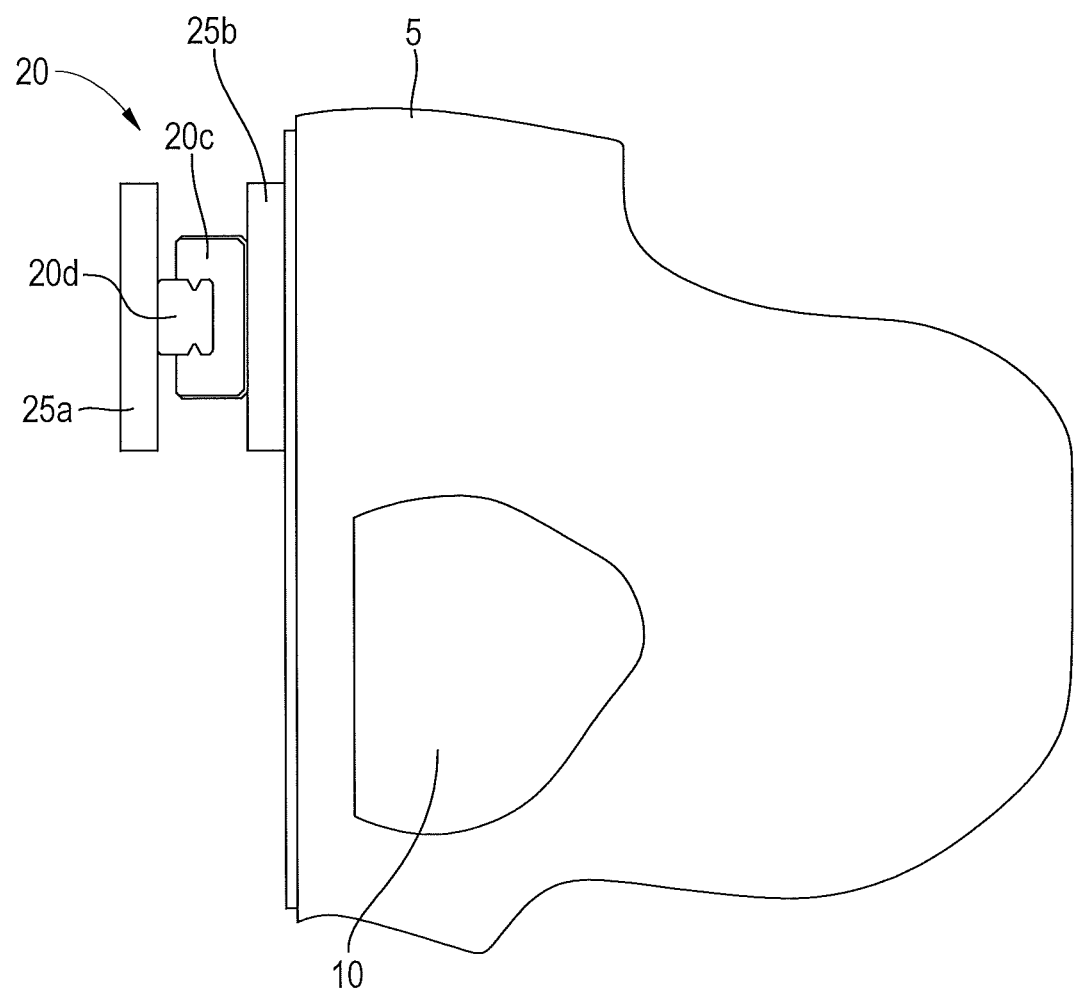
FIG. 8 is a side elevational view of the pivot, herein a dovetail assembly, mounted to the mask and to a plate for mounting to the cover or to the binocular housing.

FIG. 8 is an embodiment of the pivot 20 as a dovetail assembly comprising a receiver 20c which is generally female and a sliding insert 20d which is generally male, each being sized to fit closely to the other. A dovetail assembly is a more specialized version of a tongue and groove assembly. The sides of 20c and 20d which are not joined may be attached to the mask 5 and the binocular housing 15, or to pivot supports 25a, 25b which are attached, respectively to the eyepiece(s) or structures such as the binocular housing, and to the mask 5.

Figure 9A:
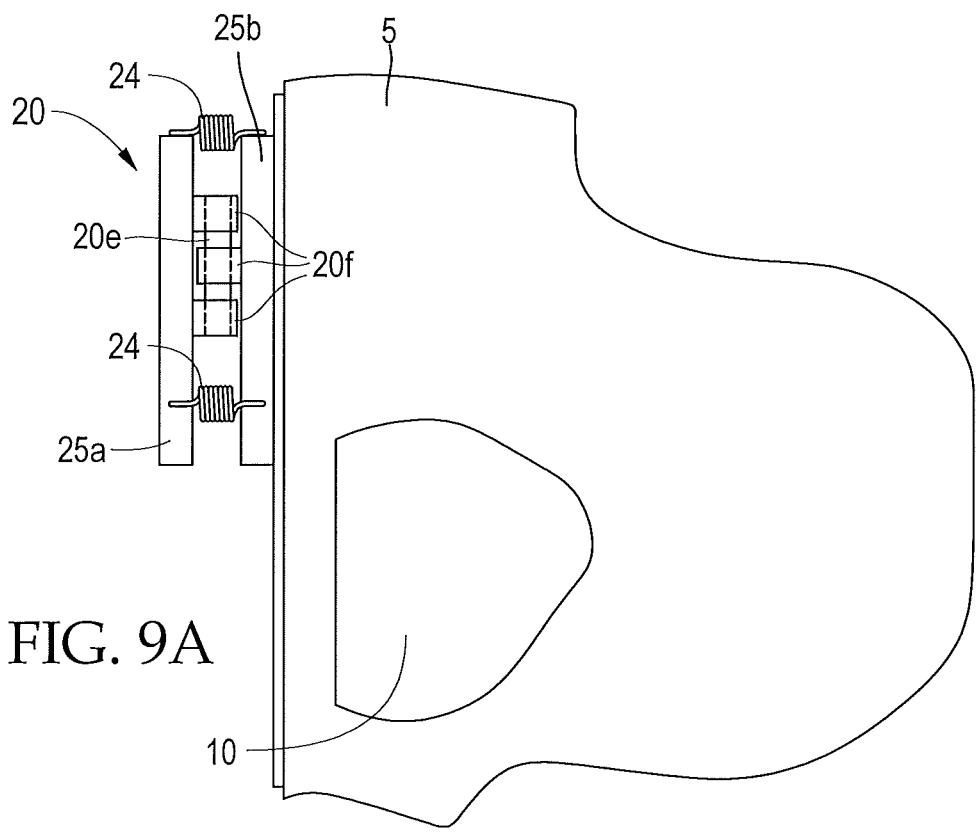
FIG. 9A is a side elevational view.
Figure 9B:
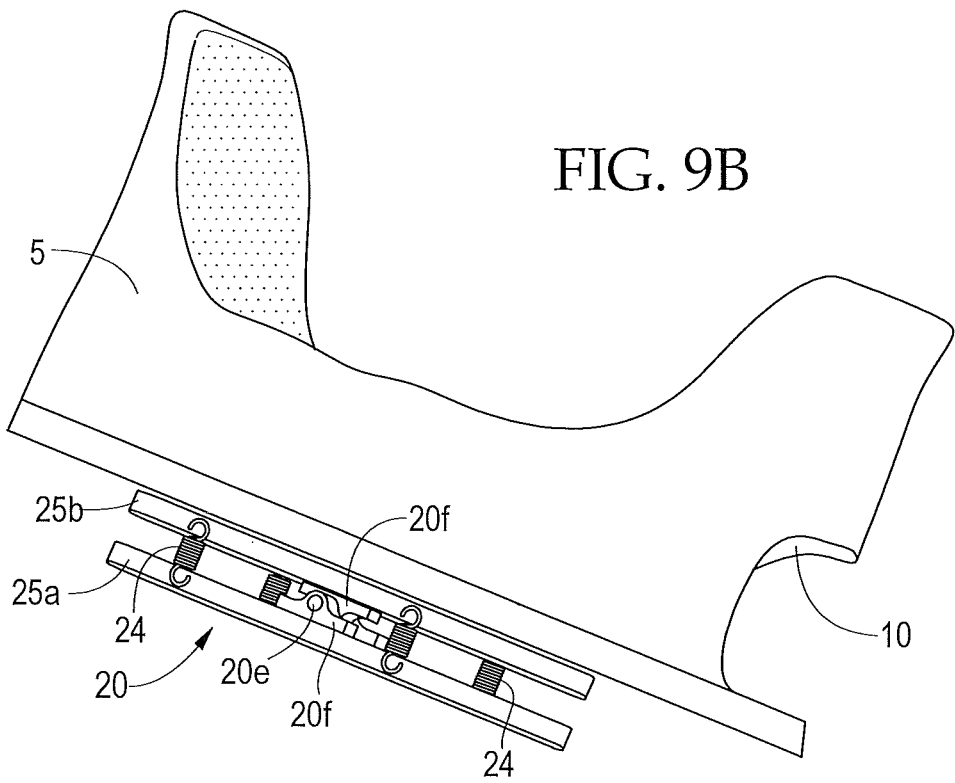
FIG. 9B is a perspective view, of the pivot, in an embodiment with a gimbal assembly, mounted to the mask and to a plate for mounting to the eyepiece(s) or to the binocular or monocular housing.

FIGS. 9A and 9B depict a pivot 20 which is a gimbal assembly comprising a rod 20e threaded through openings in gimbal supports 201, at least one attached to the mask 5 or pivot support 25b attached to the mask, or to the eyepiece 2a, 2b, to pivot support 25a attached to the eyepiece or to another structure such as the binocular housing which is indirectly connected to the eyepiece.

Figure 10:
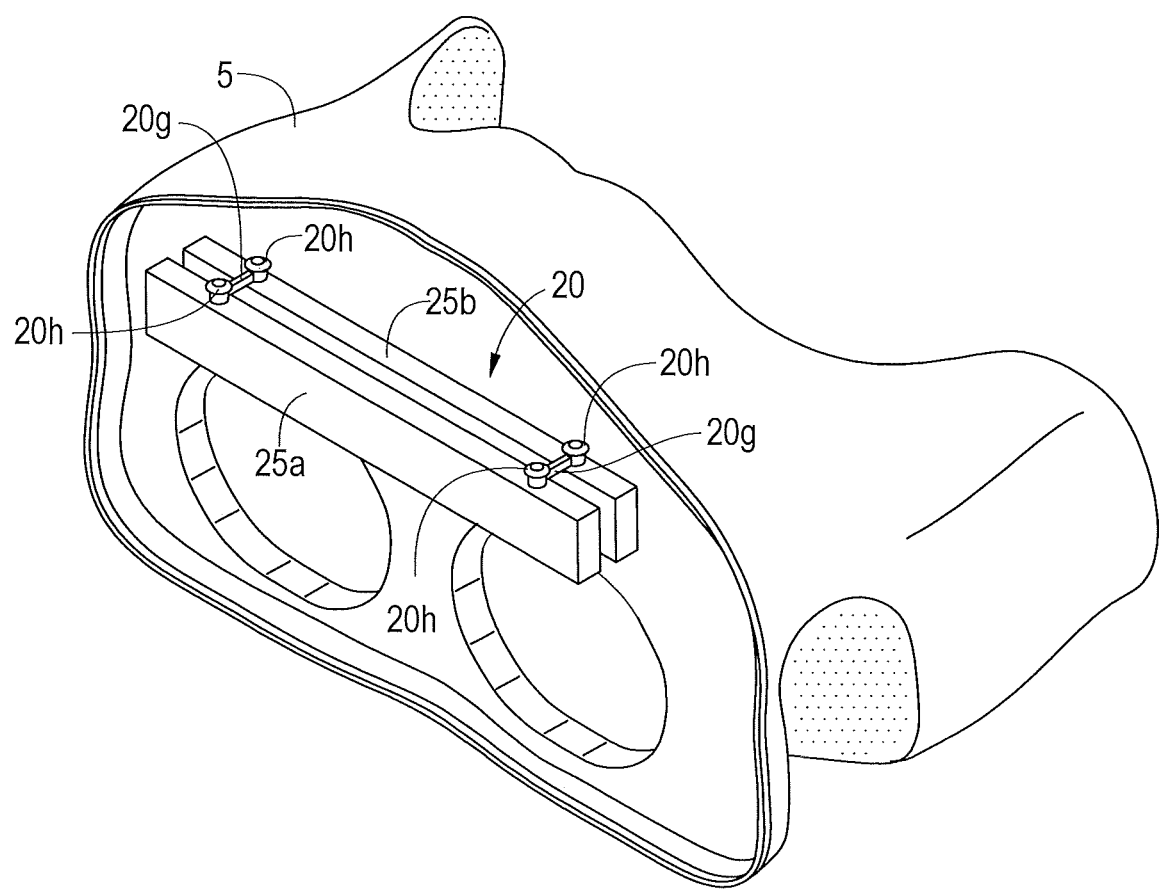
FIG. 10 is a perspective view of the pivot, in an embodiment with a rocker arm assembly, mounted to the mask and to a plate for mounting to the eyepiece(s) or to the binocular or monocular housing.

FIG. 10 is an embodiment of a pivot 20 which is a rocker assembly comprising a rocker arm 20g attached on each of its two ends to brackets 20h which allow each end of the rocker arm to pivot rotationally. One side of the rocker assembly is attached to the mask or to pivot support 25b, and the other side is attached to the eyepiece(s), the binocular/monocular housing or other structure, including pivot support 25a.

Figure 11A:
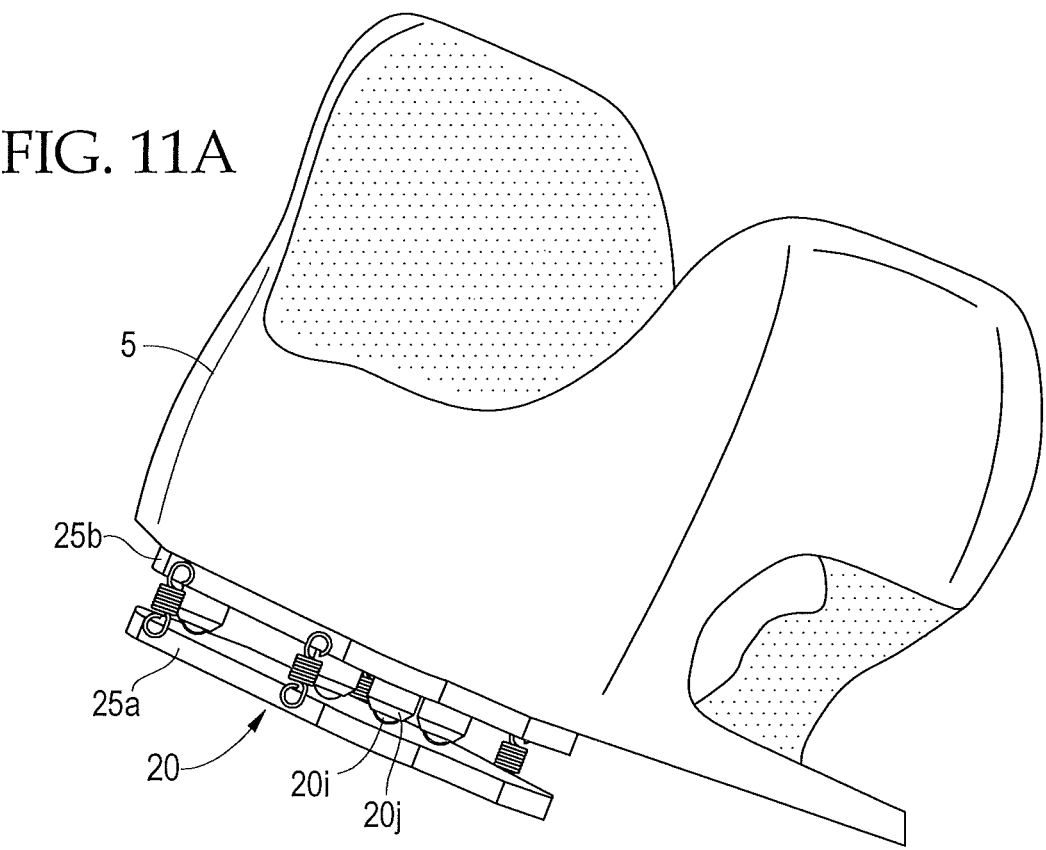
FIG. 11A is a perspective view of the pivot, in an embodiment with a recessed bearing assembly, mounted to the mask and to a plate for mounting to the eyepiece(s) or to the binocular or monocular housing.
Figure 11B:
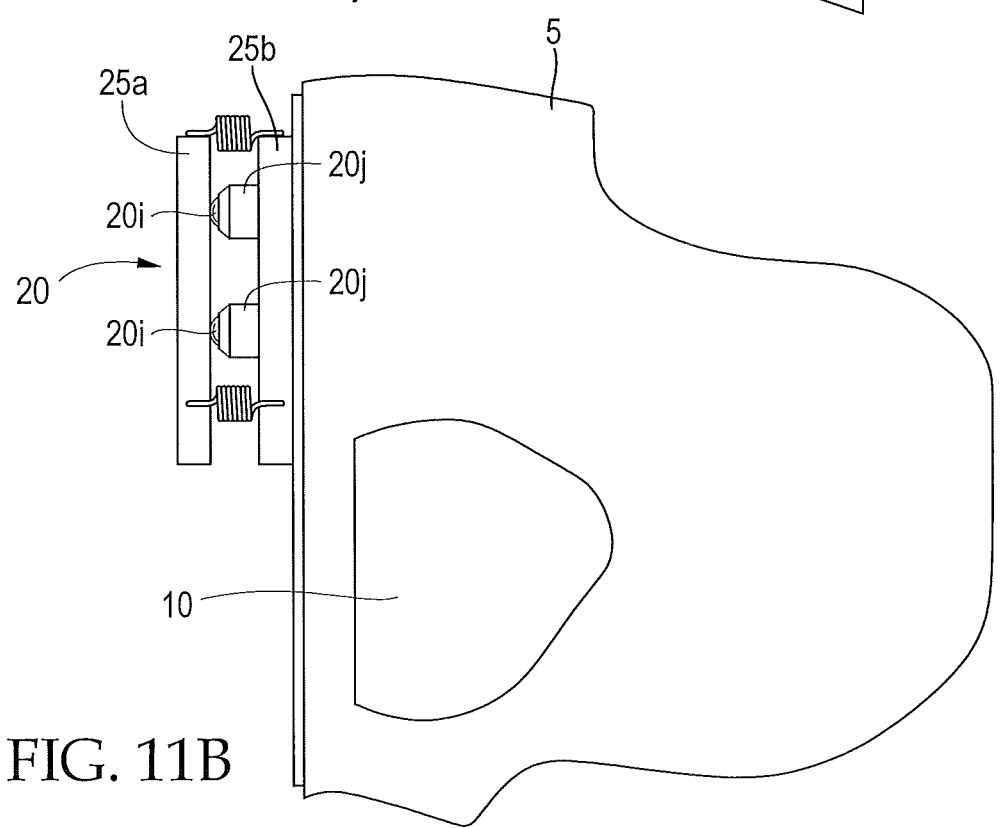
FIG. 11B is a side view of the same.

FIGS. 11A and 11B are views, perspective and side elevational, respectively, of a pivot 20 as one embodiment of a recessed bearing assembly comprising bearings 20i (shown partially) recessed in bearing housings 20j which are connected to the mask, or to a pivot support 25b attached to the mask. The bearings 20i revolve and allow another pivot support 25a (or, say, surface of the binocular housing) to move in relation to the mask or pivot support 25b.

Figure 12:
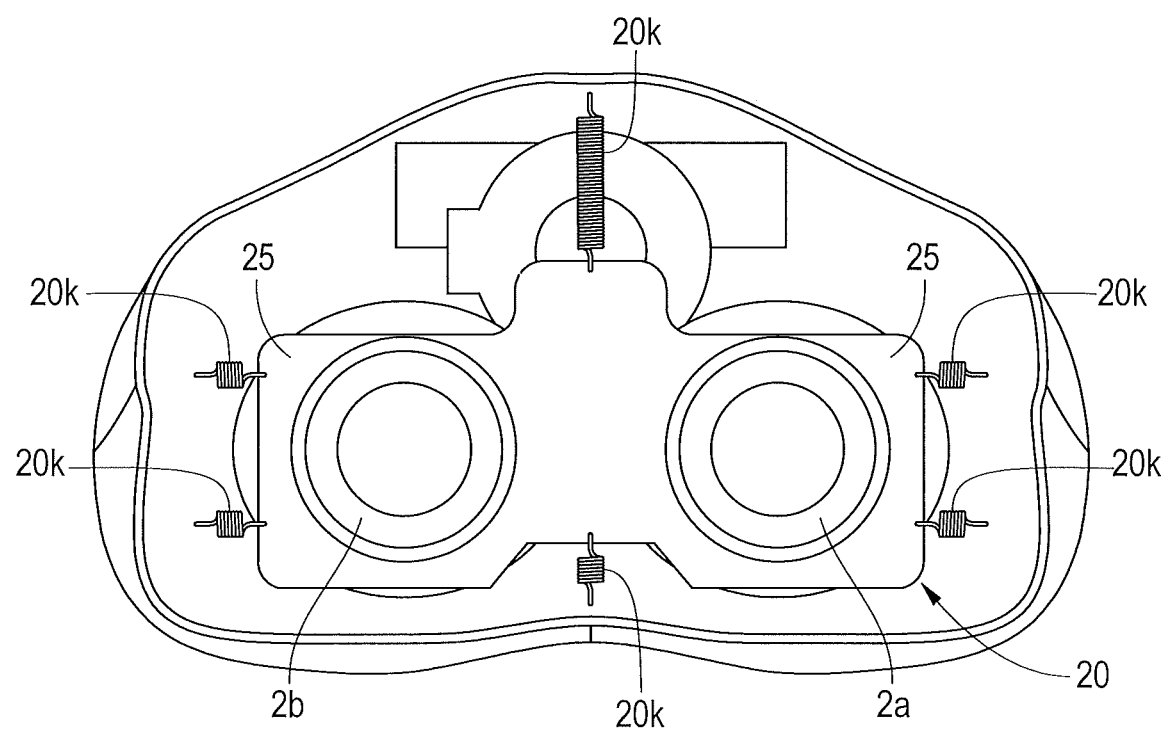
FIG. 12 is an internal elevational view of the pivot, in an embodiment with a spring mounted assembly, for mounting to the eyepiece(s) or to the binocular or monocular housing.

FIG. 12 is an elevational view of a pivot 20 which is one embodiment of a spring loaded assembly comprising springs 20k each of which is attached on one end to a plate 25 attached to the eyepieces and on the other end to the cover 19 which is secured to the mask 5.

Figure 13:
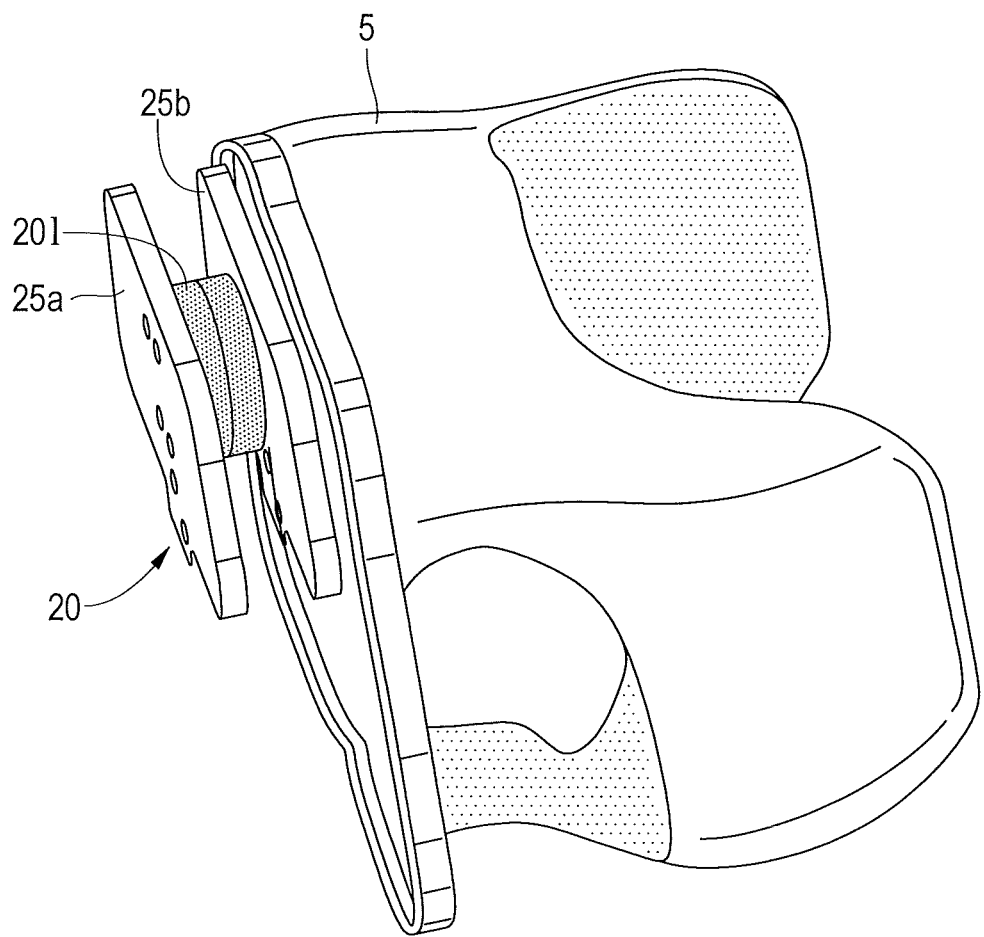
FIG. 13 is a perspective view of the pivot, in an embodiment with a pad of flexible material, mounted to the mask and to a plate for mounting to the eyepiece(s) or to the binocular or monocular housing.

FIG. 13 is a pivot 20 which is a perspective view of one embodiment of a flexible material pad 201, attached to the mask directly or by pivot support 25b, and attached to the eyepiece(s) directly or to the binocular/monocular housing (or other structure of the optical device) by means of a pivot support 25a.

Figure 14:
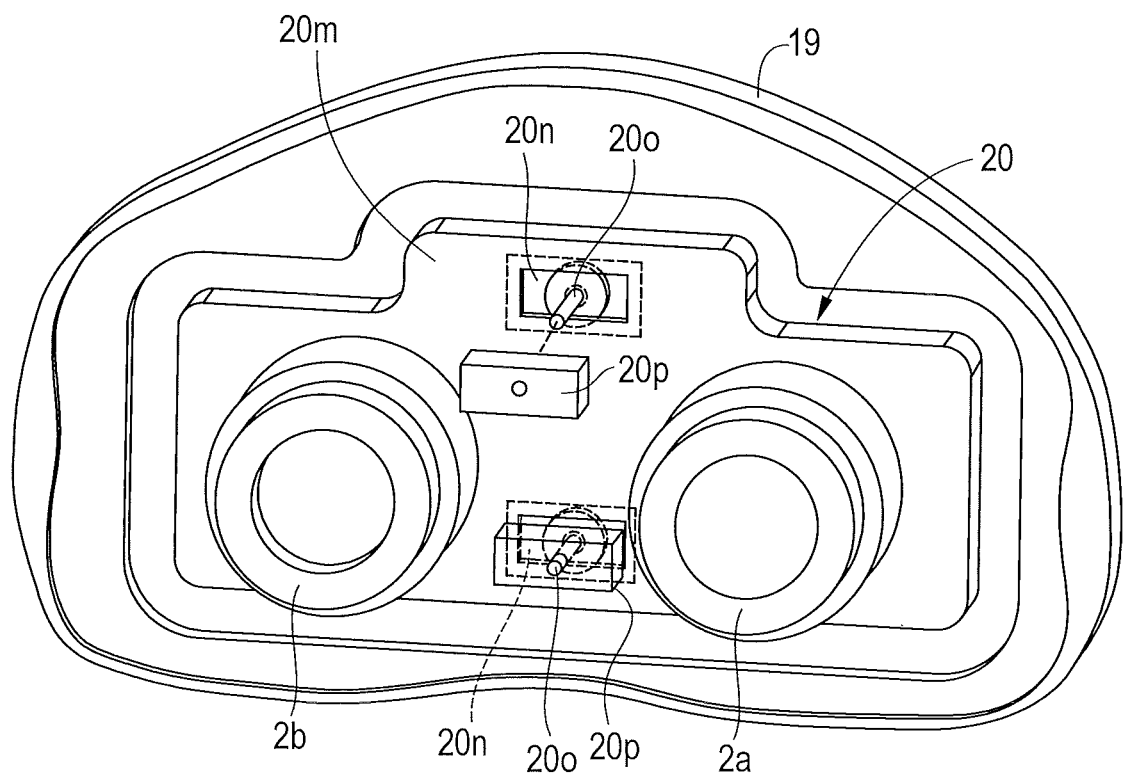
FIG. 14 is a perspective view of the pivot, in an embodiment with a low friction plate assembly, for mounting to the eyepiece(s) or to the binocular or monocular housing.
Figure 15:
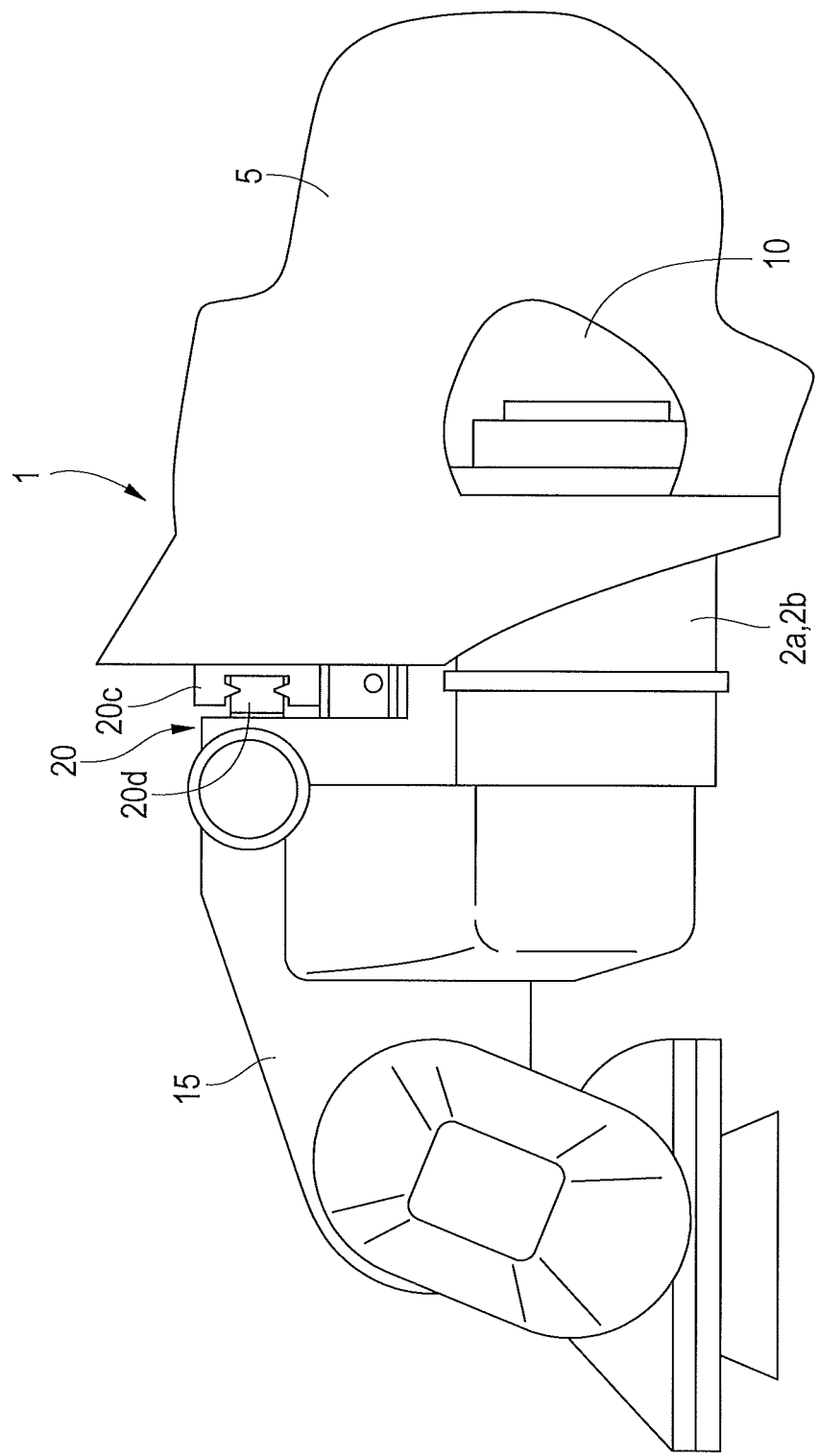
FIG. 15 is a side elevational view of mask, here a microscope, mounted to one side of the pivot, here a dovetail assembly, and the other side of the pivot is mounted directly to the binocular housing, showing also that the binocular housing is fixed securely to the eyepiece. This figure shows a slightly extended shape at the upper portion of the mask to allow it to connect to the binocular or monocular housing. Throughout this application, this side of the mask (opposite to the inner contour contacting the face) may take any shape necessary to connect it to the pivot so that the pivot may be located in a convenient location.

FIG. 14 is a perspective view of the pivot 20 in one embodiment of a low friction plate assembly comprising plates 20m and 20p which contact each other and are capable of sliding relative the other.

FIG. 15 is a side elevational view of the mask 5 connected to the pivot 20, for example a dovetail assembly as in FIG. 8, where the pivot is connected to the binocular housing, and the binocular housing is indirectly connected to the eyepieces. The binocular housing is fixed securely to the eyepieces, so movement of the mask at the pivot is movement relative to the eyepieces.

We claim:

1. An attachment to a standalone optical device, said attachment comprising a mask configured for binocular viewing and comprising two eyepiece openings, each eyepiece opening configured for connection to one of two eyepieces of the standalone optical device, said mask connected to at least one pivot at a first location of said pivot, said pivot at a second location configured for connection to the eyepieces of the optical device in order that, upon securing the attachment to the optical device, a user can rest his or her face against the mask and thereby prevent neck and back strain, see through each of the eyepiece openings, and move the mask side to side in relation to the eyepieces by applying side to side facial pressure to move the pivot while seeing through the eyepiece openings.

2. The attachment as in claim 1, wherein the at least one pivot is selected from a group consisting of, a rail assembly, a tongue and groove assembly, a dovetail assembly, a gimbal assembly, a rocker arm assembly, a spring loaded assembly, a low friction plate assembly, a bearing assembly, and flexible material.

3. The attachment as in claim 1 wherein the mask further comprises two of said pivots, and wherein the mask further comprises a half for a right side of the face separated from a half for a left side of the face, and each of said right and left halves comprises one of the pivots connected to one of the eyepieces.

4. The attachment as in claim 1, wherein the mask further comprises a customized inner contour based upon a shape of the user's face.

5. The attachment as in claim 4, wherein the customized inner contour positions each eye of the user at an optimal eye relief distance from a lens of each said eyepiece.

6. An attachment to a standalone optical device, said attachment comprising a mask configured for binocular viewing and comprising flexible material and two eyepiece openings, each said eyepiece opening configured for attachment to one of two eyepieces of the optical device in order that, upon securing the attachment to the optical device, a user can rest his or her face against the mask and thereby prevent neck and back strain, see through each of the eyepiece openings, and stretch the mask side to side in relation to the eyepieces by applying side to side facial pressure to the mask while seeing through the eyepiece openings.

7. The attachment as in claim 6, wherein the flexible material is selected from a group consisting of rubber, silicone, plastic and plastic foam.

8. The attachment as in claim 6, wherein the mask further comprises a half for a right side of the face separated from a half for a left side of the face.

9. The optical device as in claim 6, wherein the mask further comprises a customized inner contour customized for the user's face.

10. The attachment as in claim 9, wherein the customized inner contour positions an each eye of the user at an optimal eye relief distance from a lens of each of the eyepieces.

11. An attachment to a standalone optical device, said attachment comprising two eyepieces, a mask configured for binocular viewing and at least one pivot, each of said eyepieces at one location configured for connection to the optical device and comprising a lens, said mask connected to a first location of the at least one pivot and said pivot at a second location connected to the eyepieces in order that, upon securing the attachment to the optical device, a user can rest his or her face against the mask and thereby prevent neck and back strain, see through each of the eyepieces, and move the mask side to side in relation to the eyepieces by applying side to side facial pressure to move the pivots while seeing through the eyepieces.

12. The attachment as in claim 11, wherein the at least one pivot is selected from a group consisting of, a rail assembly, a tongue and groove assembly, a dovetail assembly, a gimbal assembly, a rocker arm assembly, a spring loaded assembly, a low friction plate assembly, a bearing assembly, and flexible material.

13. The attachment as in claim 11, further comprising two of said pivots, and the mask further comprises a half for a right side of the face separated from a half for a left side of the face, and each of said right and left halves comprises one of the pivots connected to one of the eyepieces.

14. The attachment as in claim 11, wherein the mask further comprises a customized inner contour for the user's face.

15. The attachment as in claim 14, wherein the customized inner contour positions eyes of the user at an optimal eye relief.

16. The attachment as in claim 11, wherein each lens further comprises a refractive prescription for one of the user's eyes.

17. The optical device as in claim 13, wherein each of the lenses has a center, and the centers are spaced at a measured pupillary distance of the user.

18. An attachment to a standalone optical device comprising two eyepieces, a mask configured to for binocular viewing and comprising flexible material, each said eyepiece at a first position connected to the optical device and comprising a lens, said eyepiece at a second position connected to said mask in order that, upon securing the attachment to the optical device, a user can rest his or her face against the mask and thereby prevent neck and back strain, see through each of the eyepieces, and stretch the mask side to side in relation to the eyepieces by applying side to side facial pressure to the mask while seeing through the eyepieces.

19. The attachment as in claim 18, wherein the flexible material is selected from a group consisting of rubber, silicone, plastic and plastic foam.

20. The attachment as in claim 18, wherein the mask further comprises a half for a right side of the face separated from a half for a left side of the face.

21. The attachment as in claim 18, wherein the mask further comprises an inner contour customized for the user's face.

22. The attachment as in claim 21, wherein the customized inner contour is configured to positions the eyes of the user at an optimal eye relief.

23. The attachment as in claim 18, wherein each of the lenses further comprises a refractive prescription for one of the user's eyes.

24. The attachment as in claim 20, wherein each of the lenses has a center, and the centers are spaced at a measured pupillary distance of the user.

25. The attachment as in claim 3, wherein each of the said right and left halves moves independently of the other said half by means of one of the pivots.

26. The attachment as in claim 8, wherein each of the said right and left halves moves independently of the other said half by means of one of the pivots.

27. The attachment as in claim 13, wherein each of the said right and left halves moves independently of the other said half by means of one of the pivots.

28. The attachment as in claim 20, wherein each of the said right and left halves moves independently of the other said half by means of one of the pivots.

* * * * *